US012690050B2

(12) United States Patent
Yang

(10) Patent No.: US 12,690,050 B2
(45) Date of Patent: Jul. 21, 2026

(54) METHOD FOR DETERMINING RESOURCE, COMMUNICATION APPARATUS, AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 449 days.

(21) Appl. No.: 18/289,882

(22) PCT Filed: May 10, 2021

(86) PCT No.: PCT/CN2021/092718
§ 371 (c)(1),
(2) Date: Nov. 7, 2023

(87) PCT Pub. No.: WO2022/236561
PCT Pub. Date: Nov. 17, 2022

(65) Prior Publication Data
US 2024/0251426 A1      Jul. 25, 2024

(51) Int. Cl.
*H04W 72/25* (2023.01)
*H04W 28/26* (2009.01)
(Continued)

(52) U.S. Cl.
CPC ........... *H04W 72/25* (2023.01); *H04W 28/26* (2013.01); *H04W 72/40* (2023.01); *H04W 76/20* (2018.02)

(58) Field of Classification Search
CPC ..... H04W 72/25; H04W 28/26; H04W 72/40; H04W 76/20; H04W 72/02; H04W 72/542; H04L 1/0693
See application file for complete search history.

(56) References Cited

U.S. PATENT DOCUMENTS

| | | | | |
|---|---|---|---|---|
| 2021/0105104 A1* | 4/2021 | Cao | ........................ | H04L 1/1893 |
| 2021/0385696 A1* | 12/2021 | Yang | ..................... | H04W 28/26 |
| 2023/0106109 A1* | 4/2023 | Zhang | ................... | H04W 76/28 |
| | | | | 370/336 |

FOREIGN PATENT DOCUMENTS

| | | | | |
|---|---|---|---|---|
| CN | 112205067 A | 1/2021 | | |
| WO | 2020091346 A1 | 5/2020 | | |
| WO | WO-2021075938 A1 * | 4/2021 | ............ | H04W 72/02 |

OTHER PUBLICATIONS

International Search Report of PCT/CN2021/092718 dated Dec. 22, 2021 with English translation, (4p).

* cited by examiner

*Primary Examiner* — Kwang B Yao
*Assistant Examiner* — Patrick Yipao Pei
(74) *Attorney, Agent, or Firm* — Arch & Lake LLP; Hao Tan; Shen Wang

(57) ABSTRACT

A method for determining a resource, performed by a sending-end device in a sidelink communication, and including: determining that first sidelink control information (SCI) is monitored; determining that a sending resource reserved by the first SCI is a target resource; determining that second SCI is monitored; determining that a sending resource reserved by the second SCI is the target resource; and determining whether the target resource is an available sending resource according to a first signal intensity value and a second signal intensity value; where, the first signal intensity value is obtained by measuring a physical sidelink control channel (PSCCH) when the first SCI is monitored, and the second signal intensity value is obtained by measuring the PSCCH when the second SCI is monitored.

20 Claims, 3 Drawing Sheets

(51) Int. Cl.
    *H04W 72/40*       (2023.01)
    *H04W 76/20*       (2018.01)

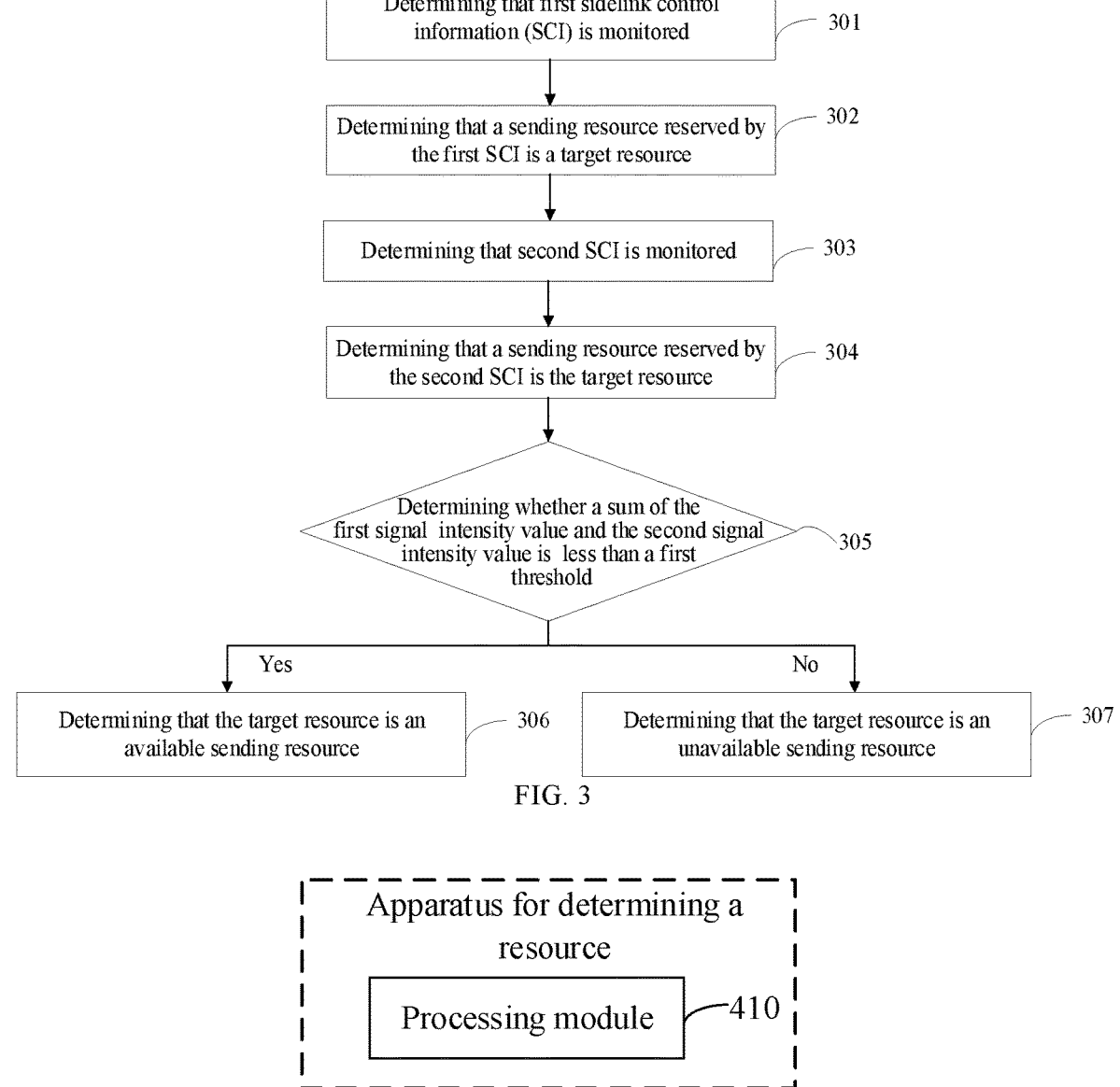

Determining that first sidelink control information (SCI) is monitored — 301

Determining that a sending resource reserved by the first SCI is a target resource — 302

Determining that second SCI is monitored — 303

Determining that a sending resource reserved by the second SCI is the target resource — 304

Determining whether a sum of the first signal intensity value and the second signal intensity value is less than a first threshold — 305

Yes

No

Determining that the target resource is an available sending resource — 306

Determining that the target resource is an unavailable sending resource — 307

FIG. 3

Apparatus for determining a resource

Processing module — 410

FIG. 4

METHOD FOR DETERMINING RESOURCE, COMMUNICATION APPARATUS, AND NON-TRANSITORY COMPUTER-READABLE STORAGE MEDIUM

CROSS REFERENCE

The present application is a U.S national phase of International Application No. PCT/CN2021/092718, filed on May 10, 2021, the entire contents of which are incorporated herein by reference for all purposes.

TECHNICAL FIELD

The present disclosure relates to the field of communications, and in particular, to a method for determining a resource, an apparatus, and a non-transitory computer-readable storage medium.

BACKGROUND

When a sidelink communication is performed, the sending-end device may determine the sending resource in the following manners.

In a first manner, the network side device performs dynamical scheduling. Among them, the network side device may dynamically allocate a sending resource on the sidelink to the sending-end device according to the cached data reported by the sending-end device.

In a second manner, the sending-end device autonomously selects in the resource pool.

SUMMARY

According to a first aspect of the embodiments of the present disclosure, there is provided a method for determining a resource, performed by a sending-end device in a sidelink communication, and including:

determining that first sidelink control information (SCI) is monitored;

determining that a sending resource reserved by the first SCI is a target resource;

determining that second SCI is monitored;

determining that a sending resource reserved by the second SCI is the target resource; and determining whether the target resource is an available sending resource according to a first signal intensity value and a second signal intensity value;

where, the first signal intensity value is obtained by measuring a physical sidelink control channel (PSCCH) when the first SCI is monitored, and the second signal intensity value is obtained by measuring the PSCCH when the second SCI is monitored.

According to a second aspect of the embodiments of the present disclosure, there is provided a non-transitory computer-readable storage medium; the storage medium stores with a computer program, and the computer program is configured to execute the method for determining a resource according to any one of the foregoing.

According to a third aspect of the embodiments of the present disclosure, there is provided a communication apparatus, including:

a processor;

a memory, configured to store an executable instruction by the processor;

where the processor is configured to execute the method for determining a resource according to any one of the foregoing.

It should be understood that the above general description and the following detailed description are exemplary and explanatory, and cannot limit the present disclosure.

BRIEF DESCRIPTION OF THE DRAWINGS

The accompanying drawings here, which are incorporated in and constitute a part of the description, illustrate embodiments consistent with the present disclosure, and serve to explain the principles of the present disclosure together with the description.

FIG. 3 is a schematic flowchart of another method for determining a resource illustrated according to some embodiments.

FIG. 4 is a block diagram of an apparatus for determining a resource illustrated according to some embodiments.

DETAILED DESCRIPTION

Example embodiments will be described in detail here, examples of which are illustrated in the accompanying drawings. When the following description refers to the accompanying drawings, same numbers in different drawings represent the same or similar elements, unless otherwise represented. The embodiments described in the following example embodiments do not represent all embodiments consistent with the present disclosure. By contrast, they are merely examples of apparatuses and methods consistent with some aspects of the present disclosure as detailed in the appended claims.

The terms used in the present disclosure is for the purpose of describing particular embodiments and are not intended to limit the disclosure. As used in the present disclosure and the appended claims, the singular forms "a," "the," and "said" are also intended to include the plural forms unless the context clearly indicates other meanings. It should also be understood that the term "and/or" as used here refers to and includes any or all possible combinations of at least one associated listed item.

It should be understood that although the terms "first," "second," "third," etc., may be used in the present disclosure to describe various information, the information should not be limited to these terms. These terms are used to distinguish the same type of information from each other. For example, without departing from the scope of the present disclosure, the first information may also be referred to as second information; similarly, the second information may also be referred to as first information. Depending on the context, the word "if" as used here may be interpreted as "at . . . time" or "when" or "in response to determining."

In related art, when the sidelink communication is performed, the sending-end device may randomly select a sending resource in a network broadcast or a pre-configured resource pool. If the sending resources selected by more than one sending-end device are the same, significant interference may be brought to the sidelink communication.

In the embodiments of the present disclosure, in order to avoid sending collision due to using the same sending resource to perform the sidelink communication by more than one sending-end device, each sending-end device may monitor SCI (Sidelink Control Information,) sent by other sending-end devices. Among them, the SCI is carried by a PSCCH (Physical Sidelink Control Channel), and different sending-end devices can send SCI on the PSCCH. Each sending-end device determines sending resources reserved by other sending-end devices based on the monitored SCI.

Furthermore, each sending-end device may determine, based on the signal intensity value obtained by the measuring the PSCCH when the SCI is monitored, whether the sending resource reserved by the SCI is an available sending resource.

Figures 1A, 1B, 2:
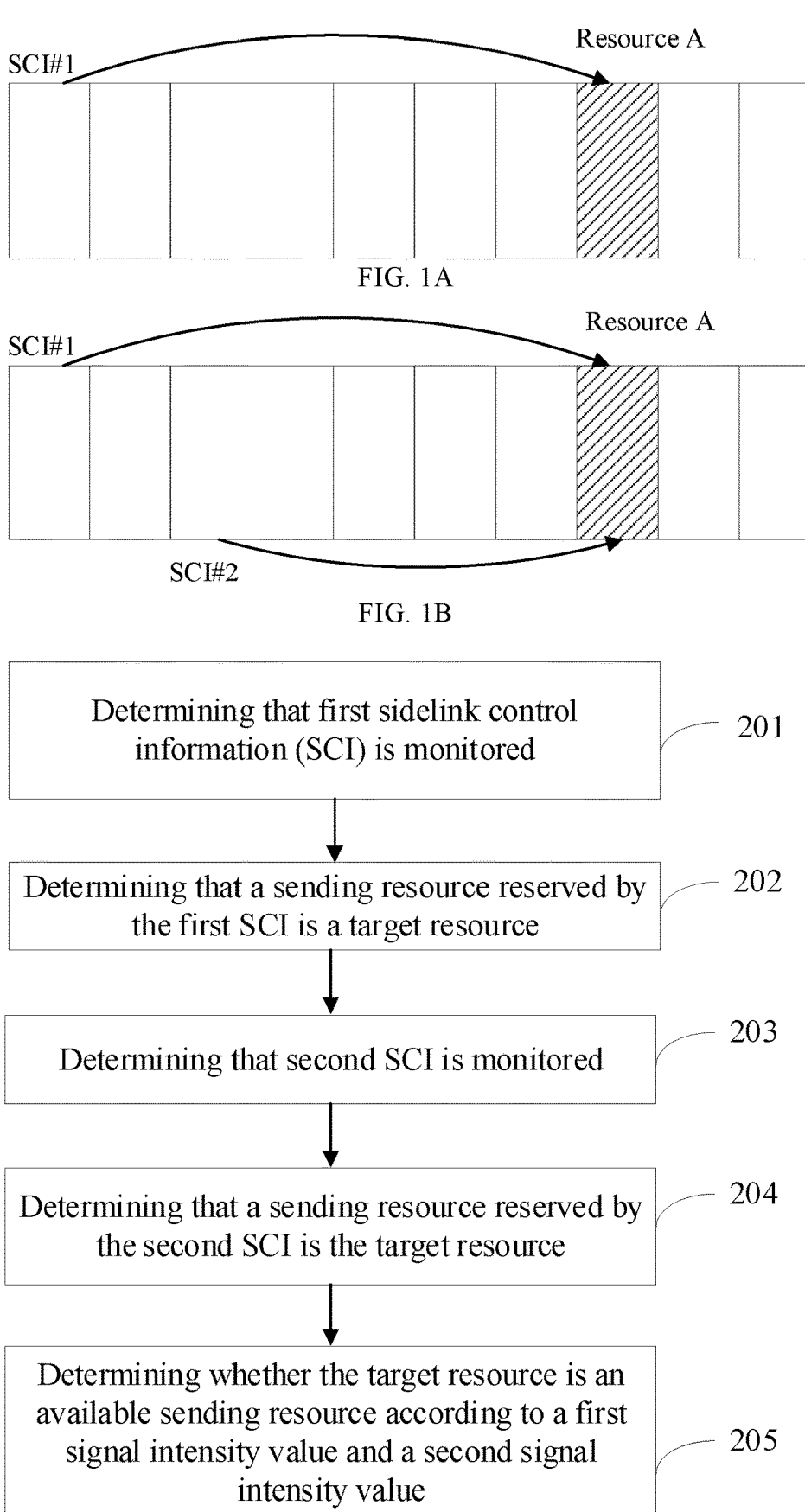
FIG. 1A is a schematic diagram of a scenario for reserving a sending resource illustrated according to some embodiments.
FIG. 1B is a schematic diagram of another scenario for reserving a sending resource illustrated according to some embodiments.
FIG. 2 is a schematic flowchart of a method for determining a resource illustrated according to some embodiments.

For example, as shown in FIG. 1A, the sending-end device 1 monitors the SCI #1, the sending resource reserved by the SCI #1 is the resource A, and the sending-end device 1 may measure the PSCCH at this time to obtain the signal intensity value #1. In case that the signal intensity value #1 is less than a specified threshold, it is determined that the resource A is an available sending resource for the sending-end device 1. That is, the sending-end device 1 may use the resource A to send the sidelink signal.

For example, as shown in FIG. 1B, the sending-end device 1 monitors the SCI #1, the sending resource reserved by the SCI #1 is the resource A, and the sending-end device 1 continues to monitor; the sending-end device 1 monitors the SCI #2, and the sending resource reserved by the SCI #2 is also the resource A; the sending-end device 1 determines that the resource A is an available sending resource based on the signal intensity value #1 obtained by measuring when the SCI #1 is monitored, and in the same way, the sending-end device 1 determines that the resource A is an available sending resource based on the signal intensity value #2 obtained by measuring when the SCI #2 is monitored. Then, the sending-end device 1 may use the resource A to send the sidelink signal. However, in fact, there are three sending-end devices using the resource A to send the sidelink signal, causing significant interference to the sidelink communication.

In order to solve this technical problem, the present disclosure provides a scheme for determining a resource.

According to embodiments of the present disclosure, there is provided a method for determining a resource. Referring to FIG. 2, FIG. 2 is a flowchart of a method for determining a resource illustrated according to some embodiments, which may be performed by a sending-end device in the sidelink communication, and the method may include the following steps.

In step 201, it is determined that first sidelink control information SCI is monitored.

In the embodiments of the present disclosure, the sending-end device may keep monitoring of the PSCCH, so as to monitor the first SCI. The first SCI is sent by another sending-end device on the PSCCH.

In step 202, it is determined that the sending resource reserved by the first SCI is a target resource.

In the embodiments of the present disclosure, the resource location of the target resource may be determined through the serial numbers of the time unit, the subcarrier, and the symbol indicated in the first SCI.

In step 203, it is determined that second SCI is monitored.

In the embodiments of the present disclosure, the sending-end device keeps monitoring the PSCCH, and after monitoring the first SCI, it may determine that the second SCI is monitored. The second SCI is sent by another sending-end device on the PSCCH. Among them, the first SCI and the second SCI may come from different sending-end devices.

In step 204, it is determined that the sending resource reserved by the second SCI is the target resource.

In step 205, it is determined whether the target resource is an available sending resource according to a first signal intensity value and a second signal intensity value.

In the embodiments of the present disclosure, when monitoring the first SCI sent on the PSCCH, the sending-end device may measure the PSCCH to obtain the first signal intensity value; when monitoring the second SCI sent on the PSCCH, the sending-end device may measure the PSCCH to obtain the second signal intensity value. When the sending resources reserved by the first SCI and the second SCI are both the target resource, the sending-end device may jointly determine whether the target resource is an available sending resource based on the first signal intensity value and the second signal intensity value. Among them, the first signal intensity value or the second signal intensity value may be an RSRP (Reference Signal Receiving Power) of the sidelink signal.

In some embodiments, the number of the second SCI may be one or more, and the number of the correspondingly determined second signal intensity values may also be one or more, which is not limited in the present disclosure.

In the foregoing embodiments, the sending-end device may determine an available sending resource or an unavailable sending resource based on more than one signal intensity value, thus avoiding selection of a sending resource with significant interference to perform the sidelink communication, and improving the reliability of Internet of Vehicles communication.

In some embodiments, referring to FIG. 3, FIG. 3 is a flowchart of a method for determining a resource illustrated according to some embodiments, which may be performed by a sending-end device in sidelink communication, and the method may include the following steps.

In step 301, it is determined that first sidelink control information SCI is monitored.

In step 302, it is determined that a sending resource reserved by the first SCI is a target resource.

In step 303, it is determined that second SCI is monitored.

In step 304, it is determined that a sending resource reserved by the second SCI is the target resource.

In step 305, it is determined whether a sum of a first signal intensity value and a second signal intensity value is less than a first threshold.

In the embodiments of the present disclosure, if the sum of the first signal intensity value and the second signal intensity value is less than the first threshold, step 306 is performed; if the sum of the first signal intensity value and the second signal intensity value is greater than the first threshold, step 307 is executed. Among them, the first signal intensity value is obtained by measuring the physical sidelink control channel (PSCCH) when the first SCI is monitored, and the second signal intensity value is obtained by measuring the PSCCH when the second SCI is monitored.

In step 306, it is determined that the target resource is an available sending resource.

In the embodiments of the present disclosure, if the sum of the first signal intensity value and the second signal intensity value is less than the first threshold, it is indicated that the interference on the target resource is less, and the sending-end device may determine that the target resource is an available sending resource.

In step 307, it is determined that the target resource is an unavailable sending resource.

In the embodiments of the present disclosure, if the sum of the first signal intensity value and the second signal intensity value is greater than the first threshold, it is indicated that the interference on the target resource is significant, and the sending-end device may determine that the target resource is an unavailable sending resource.

In the foregoing embodiments, the sending-end device may compare the sum of more than one signal intensity value with the first threshold, so as to determine the interference condition on the target resource, thus avoiding a selection of a sending resource with significant interference to perform the sidelink communication, and improving the reliability of Internet of Vehicles communication.

In some embodiments, when the first SCI is monitored, if the first signal intensity value obtained by the sending-end device measuring the PSCCH is greater than a second threshold, the sending-end device may directly determine that the target resource is an unavailable resource, and the sending-end device does not send the sidelink signal through the target resource.

In some embodiments, if the sending-end device determines that the first signal intensity value is less than the second threshold, but any second signal intensity value is greater than the second threshold, the sending-end device may also determine that the target resource is an unavailable resource, and the sending-end device does not send the sidelink signal through the target resource.

In some embodiments, when determining that the first signal intensity value is less than the second threshold and determining that the second signal intensity value is less than the second threshold, the sending-end device may determine whether the target resource is an available sending resource according to the first signal intensity value and the second signal intensity value.

In the foregoing embodiments, after the sending-end device have respectively determined that interference on the target resource is less based on the first signal intensity value and the second signal intensity value, furthermore, the sending-end device may jointly determine whether the target resource is an available sending resource based on the first signal intensity value and the second signal intensity value, which is easy to implement and high in availability.

In some embodiments, the sending-end device may receive an RRC (Radio Resource Control) signaling sent by the base station, and the sending-end device may determine the first threshold and the second threshold based on a threshold included in the RRC signaling.

In some embodiments, the RRC signaling includes one threshold, and the sending-end device determines that the first threshold is equal to the second threshold, both of which are the threshold included in the RRC signaling.

In some embodiments, the RRC signaling includes two thresholds, and the sending-end device may respectively determine the first threshold and the second threshold according to needs.

In some embodiments, the sending-end device may determine that the first threshold is a threshold corresponding to the sending resource reservation performed by more than one SCI in the RRC signaling, and determine that the second threshold is a threshold corresponding to the sending resource reservation performed by a single SCI in the RRC signaling.

In the foregoing embodiments, the sending-end device may determine the first threshold and the second threshold based on the threshold included in the RRC signaling sent by the base station, which is high in availability.

In some embodiments, when determining that the first signal intensity value is less than a second threshold, the sending-end device may store the first signal intensity value.

Furthermore, after determining the second signal intensity value, it may be determined whether the target resource is an available sending resource based on a sum of the stored first signal intensity value and the second signal intensity value.

In the foregoing embodiments, when determining that the interference on the target resource is less based on the first signal intensity value, the sending-end device may store the first signal intensity value so as to subsequently determine, after determining the second signal intensity value, whether the target resource is an available sending resource based on the sum of the stored first signal intensity value and the second signal intensity value. It is avoided to select a sending resource with significant interference to perform the sidelink communication, thus improving the reliability of Internet of Vehicles communication.

In some embodiments, when determining that the first signal intensity value is greater than the second threshold, the sending-end device determines that the target resource is an unavailable sending resource. At this time, the sending-end device does not need to store the first signal intensity value.

In some embodiments, after storing the first signal intensity value, when determining that the second signal intensity value is greater than the second threshold, the sending-end device may delete the stored first signal intensity value.

In the foregoing embodiments, when determining that the target resource is an unavailable sending resource, the sending-end device may delete the stored first signal intensity value, so as to avoid occupying excessive terminal resources, which is high in availability.

Corresponding to the foregoing method embodiments for application function implementation, the present disclosure further provides apparatus embodiments for application function implementation.

Referring to FIG. 4, FIG. 4 is a block diagram of an apparatus for determining a resource illustrated according to some embodiments, including a processing module 410.

The processing module 410 is configured to determine that first sidelink control information (SCI) is monitored.

The processing module 410 is further configured to determine that a sending resource reserved by the first SCI is a target resource.

The processing module 410 is further configured to determine that second SCI is monitored.

The processing module 410 is further configured to determine that a sending resource reserved by the second SCI is the target resource.

The processing module 410 is further configured to determine whether the target resource is an available sending resource according to a first signal intensity value and a second signal intensity value.

Among them, the first signal intensity value is obtained by measuring a physical sidelink control channel (PSCCH) when the first SCI is monitored, and the second signal intensity value is obtained by measuring the PSCCH when the second SCI is monitored.

In some embodiments, the processing module is further configured to determine that a sum of the first signal intensity value and the second signal intensity value is less than a first threshold.

The processing module is further configured to determine that the target resource is an available sending resource.

In some embodiments, the processing module is further configured to determine that a sum of the first signal intensity value and the second signal intensity value is greater than a first threshold.

The processing module is further configured to determine that the target resource is an unavailable sending resource.

In some embodiments, the processing module is further configured to determine that the first signal intensity value is less than a second threshold.

The processing module is further configured to determine that the second signal intensity value is less than the second threshold.

In some embodiments, the apparatus further includes a receiving module.

The receiving module is configured to receive radio resource control (RRC) signaling sent by a base station.

The processing module is further configured to determine the first threshold and the second threshold based on a threshold included in the RRC signaling.

In some embodiments, the RRC signaling includes one threshold.

The processing module is further configured to determine that the first threshold is a threshold included in the RRC signaling.

The processing module is further configured to determine that the second threshold is a threshold included in the RRC signaling.

In some embodiments, the RRC signaling includes two thresholds.

The processing module is further configured to determine that the first threshold is a threshold corresponding to a sending resource reservation performed by more than one SCI included in the RRC signaling.

The processing module is further configured to determine that the second threshold is a threshold corresponding to a sending resource reservation performed by a single SCI included in the RRC signaling.

For the apparatus embodiments, since they basically correspond to the method embodiments, for the related part, reference can be made to the part of description of the method embodiments. The apparatus embodiments described above are merely illustrative, where the units described above as separate components may or may not be physically separate, and components displayed as units may or may not be physical units, that is, they may be located in one place, or may also be distributed on more than one network unit. Some or all of the modules may be selected according to actual needs to achieve the objectives of the solutions of the present disclosure. Those of ordinary skill in the art may understand and implement them without involving any creative effort.

Correspondingly, the present disclosure further provides a non-transitory computer-readable storage medium, where the storage medium stores with a computer program, and the computer program is configured to execute any of the above method for determining a resource.

Correspondingly, the present disclosure further provides a communication apparatus, including:

a processor;

a memory, configured to store an executable instruction by the processor;

where, the processor is configured to execute any of the above method for determining a resource.

Figure 5:
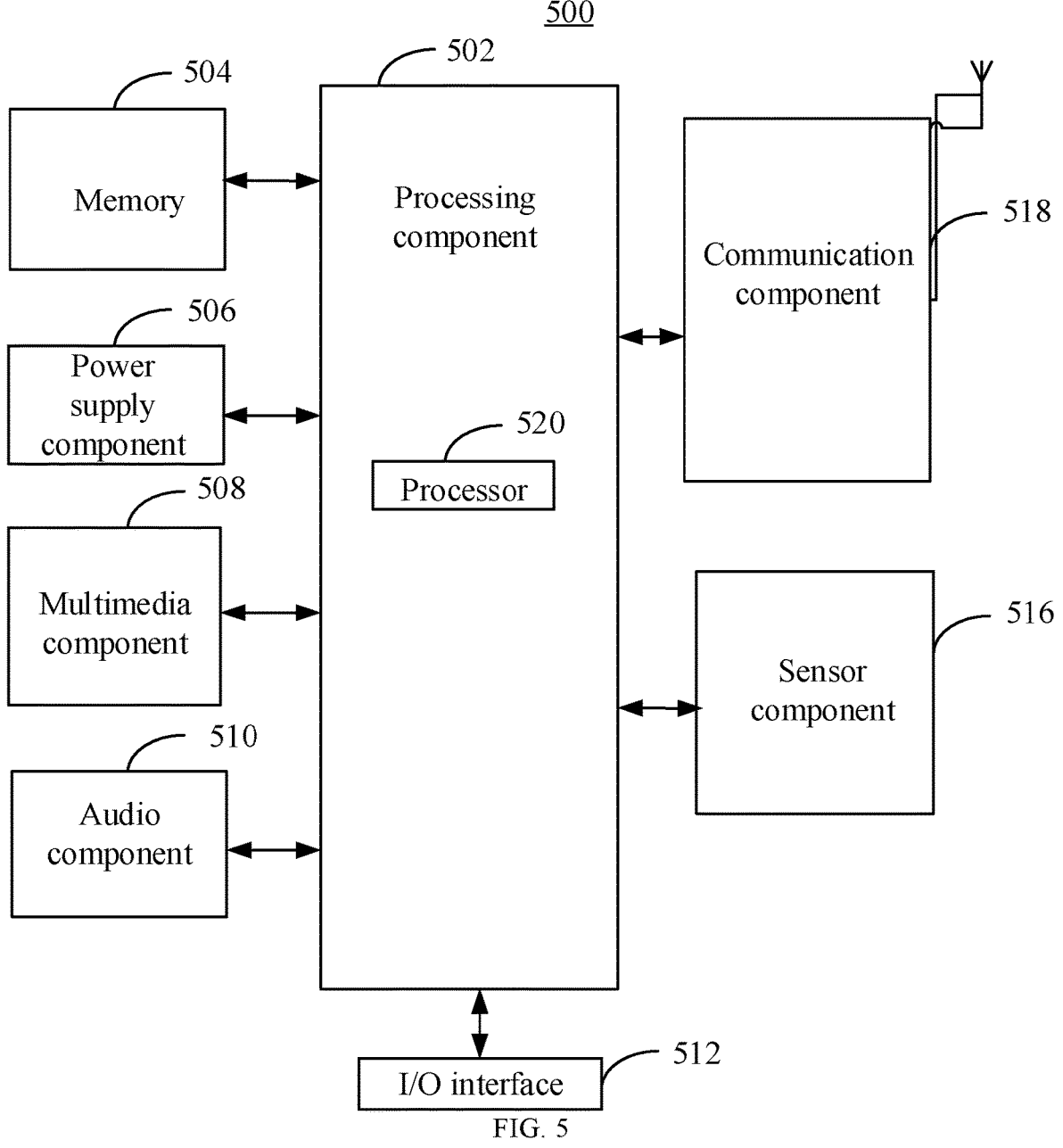
FIG. 5 is a schematic structural diagram of a communication apparatus illustrated according to some embodiments of the present disclosure.

FIG. 5 is a block diagram of a communication apparatus 500 illustrated according to some embodiments. For example, the communications apparatus 500 may be a terminal, such as a mobile phone, a tablet computer, an electronic book reader, a multimedia playback device, a wearable device, a vehicle-mounted terminal, an iPad, a smart television, etc.

Referring to FIG. 5, the communication apparatus 500 may include one or more of the following components: a processing component 502, a memory 504, a power supply component 506, a multimedia component 508, an audio component 510, an input/output (I/O) interface 512, a sensor component 516, and a communication component 518.

The processing component 502 generally controls the overall operation of the communication apparatus 500, such as operations associated with display, telephone calls, data communications, camera operations, and recording operations. The processing component 502 may include one or more processors 520 to execute instructions to complete all or part of the steps of the above method for determining a resource. In addition, the processing component 502 may include one or more modules to facilitate interaction between the processing component 502 and other components. For example, the processing component 502 may include a multimedia module to facilitate interaction between the multimedia component 508 and the processing component 502. For another example, the processing component 502 may read the executable instruction from the memory to implement the steps of the method for determining a resource provided by the above embodiments.

The memory 504 is configured to store various types of data to support operations at the communication apparatus 500. Examples of such data include instructions for any application or method operated on the communication apparatus 500, contact data, phonebook data, messages, pictures, videos, and the like. The memory 504 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 506 provides electrical power to various components of the communication apparatus 500. The power supply component 506 may include a power management system, one or more power sources, and other components associated with generating, managing, and allocating power to the communication apparatus 500.

The multimedia component 508 includes a display screen providing an output interface between the communication apparatus 500 and a user. In some embodiments, the multimedia component 508 includes a front-facing camera and/or a rear-facing camera. When the communication apparatus 500 is in an operation mode, such as a photographing mode or a video mode, the front-facing camera and/or the rear-facing camera may receive external multimedia data. Each of the front camera and the rear camera may be a fixed optical lens system or have a focal length and an optical zoom capability.

The audio component 510 is configured to output and/or input an audio signal. For example, the audio component 510 includes a microphone (MIC) configured to receive an external audio signal when the communication apparatus 500 is in an operation mode, such as a call mode, a recording mode, and a speech recognition mode. The received audio signal may be further stored in the memory 504 or transmitted via the communication component 518. In some embodiments, the audio component 510 further includes a speaker configured to output an audio signal.

The I/O interface 512 provides an interface between the processing component 502 and a peripheral interface module, and the peripheral interface module may be a keyboard, a click wheel, a button, or the like. The button may include, but is not limited to, a home button, a volume button, a start button, and a lock button.

The sensor component 516 includes one or more sensors for providing status assessments of various aspects for the communications device 500. For example, the sensor component 516 may detect the on/off state of the communication apparatus 500, the relative positioning of the components; for example, the components are the display and the keypad of the communication apparatus 500. The sensor component 516 may also detect the position change of the communication apparatus 500 or one component of the communication apparatus 500, the presence or absence contact between the user and the communication apparatus 500, the orientation or acceleration/deceleration of the communication apparatus 500, and the temperature change of the communication apparatus 500. The sensor component 516 may include a proximity sensor configured to detect the presence of nearby objects without any physical contact. The sensor component 516 may also include an optical sensor, such as a CMOS or CCD image sensor, for use in an imaging application. In some embodiments, the sensor component 516 may further include an acceleration sensor, a gyroscope sensor, a magnetic sensor, a pressure sensor, or a temperature sensor.

The communication component 518 is configured to facilitate wired or wireless communication between the communication apparatus 500 and other devices. The communication apparatus 500 may access a wireless network based on a communication standard, such as Wi-Fi, 2G, 3G, 4G, or 5G, or a combination of them. In an example embodiment, the communication component 518 receives broadcast signals or broadcast related information from an external broadcast management system via a broadcast channel. In an example embodiment, the communication component 518 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the communication apparatus 500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, for performing the above method for determining a resource.

In an example embodiment, there is further provided a non-transitory computer-readable storage medium including instructions, such as a memory 504 including instructions. The instructions may be executed by a processor 520 of the communication apparatus 500 to complete the above method for determining a resource. For example, the non-transitory computer-readable storage medium may be a ROM, a random access memory (RAM), a CD-ROM, a magnetic tape, a floppy disk, an optical data storage device, etc.

In order to overcome the problems existing in the related art, according the embodiments of the present disclosure, there is provided a method for determining a resource, an apparatus, and a non-transitory computer-readable storage medium, which may be applied to Internet of Vehicles, such as vehicle to everything (V2X) communication, long term evolution-vehicle (LTE-V) communication, vehicle to vehicle (V2V) communication, etc., or may be used in the fields of intelligent driving, intelligent Internet-connected vehicles, etc.

According to a first aspect of the embodiments of the present disclosure, there is provided a method for determining a resource, performed by a sending-end device in a sidelink communication, and including:

determining that first sidelink control information (SCI) is monitored;

determining that a sending resource reserved by the first SCI is a target resource;

determining that second SCI is monitored;

determining that a sending resource reserved by the second SCI is the target resource; and determining whether the target resource is an available sending resource according to a first signal intensity value and a second signal intensity value;

where, the first signal intensity value is obtained by measuring a physical sidelink control channel (PSCCH) when the first SCI is monitored, and the second signal intensity value is obtained by measuring the PSCCH when the second SCI is monitored.

In some embodiments, determining whether the target resource is an available sending resource according to a first signal intensity value and a second signal intensity value includes:

determining that a sum of the first signal intensity value and the second signal intensity value is less than a first threshold; and determining that the target resource is an available sending resource.

In some embodiments, determining whether the target resource is an available sending resource according to a first signal intensity value and a second signal intensity value includes:

determining that a sum of the first signal intensity value and the second signal intensity value is greater than a first threshold; and determining that the target resource is an unavailable sending resource.

In some embodiments, the method further includes:

determining that the first signal intensity value is less than a second threshold; and determining that the second signal intensity value is less than the second threshold.

In some embodiments, the method further includes:

receiving radio resource control (RRC) signaling sent by a base station; and determining the first threshold and the second threshold based on a threshold included in the RRC signaling.

In some embodiments, the RRC signaling includes one threshold, and determining the first threshold and the second threshold based on a threshold included in the RRC signaling includes:

determining that the first threshold is the threshold included in the RRC signaling; and determining that the second threshold is the threshold included in the RRC signaling.

In some embodiments, the RRC signaling includes two thresholds, and determining the first threshold and the second threshold based on a threshold included in the RRC signaling includes:

determining that the first threshold is a threshold corresponding to a sending resource reservation performed by more than one SCI included in the RRC signaling; and determining that the second threshold is a threshold corresponding to a sending resource reservation performed by a single SCI included in the RRC signaling.

According to a second aspect of the embodiments of the present disclosure, there is provided an apparatus for determining a resource, including:

a processing module, configured to determine that first sidelink control information (SCI) is monitored;

the processing module is further configured to determine that a sending resource reserved by the first SCI is a target resource;

the processing module is further configured to determine that second SCI is monitored;

the processing module is further configured to determine that a sending resource reserved by the second SCI is the target resource; and the processing module is further configured to determine whether the target resource is an available sending resource according to a first signal intensity value and a second signal intensity value;

where, the first signal intensity value is obtained by measuring a physical sidelink control channel (PSCCH) when the first SCI is monitored, and the second signal intensity value is obtained by measuring the PSCCH when the second SCI is monitored.

In some embodiments, the processing module is further configured to determine that a sum of the first signal intensity value and the second signal intensity value is less than a first threshold; and the processing module is further configured to determine that the target resource is an available sending resource.

In some embodiments, the processing module is further configured to determine that a sum of the first signal intensity value and the second signal intensity value is greater than a first threshold; and the processing module is further configured to determine that the target resource is an unavailable sending resource.

In some embodiments, the processing module is further configured to determine that the first signal intensity value is less than a second threshold; and the processing module is further configured to that the second signal intensity value is less than the second threshold.

In some embodiments, the apparatus further includes:

a receiving module, configured to receive radio resource control (RRC) signaling sent by a base station;

the processing module is further configured to determine the first threshold and the second threshold based on a threshold included in the RRC signaling.

In some embodiments, the RRC signaling includes one threshold;

the processing module is further configured to determine that the first threshold is a threshold included in the RRC signaling; and the processing module is further configured to that the second threshold is a threshold included in the RRC signaling.

In some embodiments, the RRC signaling includes two thresholds;

the processing module is further configured to determine that the first threshold is a threshold corresponding to a sending resource reservation performed by more than one SCI included in the RRC signaling; and the processing module is further configured to that the second threshold is a threshold corresponding to a sending resource reservation performed by a single SCI included in the RRC signaling.

According to a third aspect of the embodiments of the present disclosure, there is provided a non-transitory computer-readable storage medium; the storage medium stores with a computer program, and the computer program is configured to execute the method for determining a resource according to any one of the foregoing.

According to a fourth aspect of the embodiments of the present disclosure, there is provided a communication apparatus, including:

a processor;

a memory, configured to store an executable instruction by the processor;

where the processor is configured to execute the method for determining a resource according to any one of the foregoing.

The technical solutions provided in the embodiments of the present disclosure may include the following beneficial effects.

In the embodiments of the present disclosure, the sending-end device in the sidelink communication may determine that a sending resource reserved by a first SCI is a target resource; if a sending resource reserved by a second SCI is also the target resource, the terminal may jointly determine whether the target resource is an available sending resource according to a first signal intensity value and a second signal intensity value. Among them, the first signal intensity value is obtained by measuring a physical sidelink control channel (PSCCH) when the first SCI is monitored, and the second signal intensity value is obtained by measuring the PSCCH when the second SCI is monitored. In the present disclosure, the sending-end device may determine an available sending resource or an unavailable sending resource based on more than one signal intensity value, thus avoiding selection of a sending resource with a significant interference to perform the sidelink communication, and improving the reliability of Internet of Vehicles communication.

Other embodiments of the present disclosure will be apparent to those skilled in the art from consideration of the description and practice of the present disclosure here. The present disclosure is intended to cover any variations, uses, or adaptations of the present disclosure following the general principles of the present disclosure and including common general knowledge or conventional technical means in the art not disclosed in the present disclosure. The description and embodiments are considered as examples only, with a true scope and spirit of the present disclosure being indicated by the following claims.

It should be understood that the present disclosure is not limited to the exact construction that has been described above and illustrated in the accompanying drawings, and that various modifications and changes may be made without departing from the scope of the present disclosure. The scope of the present disclosure is limited by the appended claims.

What is claimed is:

1. A method for determining a resource, performed by a sending-end device in a sidelink communication, and comprising:

determining that first sidelink control information (SCI) is monitored;

determining that a sending resource reserved by the first SCI is a target resource;

determining that second SCI is monitored;

determining that a sending resource reserved by the second SCI is the target resource; and determining whether the target resource is an available sending resource according to a first signal intensity value and a second signal intensity value;

wherein, the first signal intensity value is obtained by measuring a physical sidelink control channel (PSCCH) when the first SCI is monitored, and the second signal intensity value is obtained by measuring the PSCCH when the second SCI is monitored.

2. The method according to claim 1, wherein determining whether the target resource is the available sending resource according to the first signal intensity value and the second signal intensity value comprises:

determining that a sum of the first signal intensity value and the second signal intensity value is less than a first threshold; and determining that the target resource is the available sending resource.

3. The method according to claim 1, wherein determining whether the target resource is the available sending resource according to the first signal intensity value and the second signal intensity value comprises:

determining that a sum of the first signal intensity value and the second signal intensity value is greater than a first threshold; and determining that the target resource is an unavailable sending resource.

4. The method according to claim 1, further comprising:

determining that the first signal intensity value is less than a second threshold; and determining that the second signal intensity value is less than the second threshold.

5. The method according to claim 4, further comprising:

receiving radio resource control (RRC) signaling sent by a base station; and determining the first threshold and the second threshold based on a threshold comprised in the RRC signaling.

6. The method according to claim 5, wherein, the RRC signaling comprises one threshold, and determining the first threshold and the second threshold based on the threshold comprised in the RRC signaling comprises:

determining that the first threshold is the threshold comprised in the RRC signaling; and determining that the second threshold is the threshold comprised in the RRC signaling.

7. The method according to claim 5, wherein the RRC signaling comprises two thresholds, and determining the first threshold and the second threshold based on the threshold comprised in the RRC signaling comprises:

determining that the first threshold is a threshold corresponding to a sending resource reservation performed by more than one SCI comprised in the RRC signaling; and determining that the second threshold is a threshold corresponding to a sending resource reservation performed by a single SCI comprised in the RRC signaling.

8. A non-transitory computer-readable storage medium, wherein the storage medium stores a computer program, and the computer program, when executed, is configured to;

determine that first sidelink control information (SCI) is monitored;

determine that a sending resource reserved by the first SCI is a target resource;

determine that second SCI is monitored;

determine that a sending resource reserved by the second SCI is the target resource; and determine whether the target resource is an available sending resource according to a first signal intensity value and a second signal intensity value;

wherein, the first signal intensity value is obtained by measuring a physical sidelink control channel (PSCCH) when the first SCI is monitored, and the second signal intensity value is obtained by measuring the PSCCH when the second SCI is monitored.

9. The non-transitory computer-readable storage medium according to claim 8, wherein the computer program is further configured to:

determine that a sum of the first signal intensity value and the second signal intensity value is less than a first threshold; and determine that the target resource is the available sending resource.

10. The non-transitory computer-readable storage medium according to claim 8, wherein the computer program is further configured to:

determine that a sum of the first signal intensity value and the second signal intensity value is greater than a first threshold; and determine that the target resource is an unavailable sending resource.

11. The non-transitory computer-readable storage medium according to claim 8, wherein, the computer program is further configured to:

determine that the first signal intensity value is less than a second threshold; and determine that the second signal intensity value is less than the second threshold.

12. The non-transitory computer-readable storage medium according to claim 11, wherein, the computer program is further configured to:

receive radio resource control (RRC) signaling sent by a base station; and determine the first threshold and the second threshold based on a threshold comprised in the RRC signaling.

13. The non-transitory computer-readable storage medium according to claim 12, wherein, the computer program is further configured to:

determine that the first threshold is the threshold comprised in the RRC signaling; and determine that the second threshold is the threshold comprised in the RRC signaling.

14. A communication apparatus, comprising:

a processor;

a memory, having stored thereon an instruction executable by the processor;

wherein the processor, when executing the instruction, is configured to:

determine that first sidelink control information (SCI) is monitored;

determine that a sending resource reserved by the first SCI is a target resource;

determine that second SCI is monitored;

determine that a sending resource reserved by the second SCI is the target resource; and determine whether the target resource is an available sending resource according to a first signal intensity value and a second signal intensity value;

wherein, the first signal intensity value is obtained by measuring a physical sidelink control channel (PSCCH) when the first SCI is monitored, and the second signal intensity value is obtained by measuring the PSCCH when the second SCI is monitored.

15. The communication apparatus according to claim 14, wherein the processor is further configured to:

determine that a sum of the first signal intensity value and the second signal intensity value is less than a first threshold; and determine that the target resource is the available sending resource.

16. The communication apparatus according to claim 14, wherein the processor is further configured to:

determine that a sum of the first signal intensity value and the second signal intensity value is greater than a first threshold; and determine that the target resource is an unavailable sending resource.

17. The communication apparatus according to claim 14, wherein, the processor is further configured to:

determine that the first signal intensity value is less than a second threshold; and determine that the second signal intensity value is less than the second threshold.

18. The communication apparatus according to claim 17, wherein, the processor is further configured to:

receive radio resource control (RRC) signaling sent by a base station; and determine the first threshold and the second threshold based on a threshold comprised in the RRC signaling.

19. The communication apparatus according to claim 18, wherein, the processor is further configured to:

determine that the first threshold is the threshold comprised in the RRC signaling; and determine that the second threshold is the threshold comprised in the RRC signaling.

20. The communication apparatus according to claim 18, wherein the processor is further configured to:

determine that the first threshold is a threshold corresponding to a sending resource reservation performed by more than one SCI comprised in the RRC signaling; and determine that the second threshold is a threshold corresponding to a sending resource reservation performed by a single SCI comprised in the RRC signaling.

* * * * *